United States Patent [19]

Petterson et al.

[11] 4,231,804

[45] Nov. 4, 1980

[54] VAPOR STRIPPING METHOD

[76] Inventors: Robert C. Petterson, 7800 Cohn St., New Orleans, La. 70118; Roger C. Loubier, 1000 Milton St., Gretna, La. 70053

[21] Appl. No.: 870,103

[22] Filed: Jan. 17, 1978

[51] Int. Cl.$^2$ .............................................. B08B 5/00
[52] U.S. Cl. .................... 134/11; 134/22 R; 134/31; 134/37; 134/38; 134/40
[58] Field of Search ................. 134/11, 31, 37, 38, 134/22 R, 40

[56] References Cited

U.S. PATENT DOCUMENTS

| | | | |
|---|---|---|---|
| 2,409,402 | 10/1946 | Thompson et al. | 134/31 |
| 2,571,328 | 10/1951 | Baker | 134/31 X |
| 2,755,208 | 7/1956 | Kearney | 134/11 |
| 2,756,168 | 7/1956 | Ruggles | 134/40 X |
| 2,956,911 | 10/1960 | Jelen | 134/22 R |
| 2,967,121 | 1/1961 | Allen et al. | 134/22 R X |
| 3,042,553 | 7/1962 | Kearney et al. | 134/11 |
| 3,391,085 | 7/1968 | Crockett | 134/38 X |
| 3,794,524 | 2/1974 | Nogueira et al. | 134/38 X |
| 3,832,235 | 8/1974 | Cooper et al. | 134/11 X |
| 4,029,517 | 6/1977 | Rand | 134/11 |
| 4,056,403 | 11/1977 | Cramer et al. | 134/11 X |
| 4,101,340 | 7/1978 | Rand | 134/11 |

*Primary Examiner*—Marc L. Caroff
*Attorney, Agent, or Firm*—Levonna Herzog

[57] ABSTRACT

Coatings, such as paint or oil, are stripped from the surface of a coated object by circulating a stream of a stripping composition in a gaseous state at ambient temperature and pressure into contact with the surface. The stripping composition is normally a liquid at ambient temperature and pressure and has a partial pressure of at least 5 mm of Hg. at ambient conditions. The contacting procedure is conducted substantially in the absence on the surface of liquid condensate of the stripping composition.

22 Claims, No Drawings

VAPOR STRIPPING METHOD

BACKGROUND OF THE INVENTION

The present invention relates to a method for stripping protective coatings from coated objects. More particularly, the present invention concerns a method for stripping a protective coating obtained from compositions based on organic resins and/or prepared with organic vehicles, such as paint, shellac, varnish, lacquer and the like. The method of the invention is especially useful for removing such coatings from objects have irregular surfaces and from large surfaces, including vertical and inclined surfaces in the interior of large constructions, such as storage bins and tanks on land and the holds and ballast tanks of ships.

Commonly, paint is stripped from painted objects by application of an organic or inorganic solvent or mixture thereof. As discussed in Kirk-Othmer's ENCYCLOPEDIA OF CHEMICAL TECHNOLOGY, Vol. 14, pps. 485–493, 2nd Edition, John Wiley and Sons, 1967, organic paint removers generally fall into three classes: compositions based on chlorinated hydrocarbon solvents, compositions consisting of mixtures of other solvents and removers based on aqueous solutions or dispersions of phenols and/or organic acids and other compounds. Inorganic strippers, such as an aqueous solution of caustic soda and in some cases, mineral acids are also used, particularly for industrial applications.

Among the chlorinated hydrocarbon solvents, methylene chloride (dichloromethane) has been found to be particularly effective and formulations of methylene chloride suitable for application by dip, brush, spray and delivery from aerosol cans are known. Such compositions also usually contain additives including thickeners, evaporation retarders and detergents.

Organic solvent formulations for stripping paint and other coatings may be of the "scrape off" type or "flush off" type. Generally, the stripping composition is applied to the coated object by one of the foregoing methods and allowed to stand for some time, after which, the coating which has become swollen and/or softened is removed from the surface, by scraping, in the case of "scrape off" formulations or by flushing with water and/or by wiping with a damp rag in the case of "flush off" formulations.

The foregoing methods are relatively expensive, since the organic solvent, except in the case of application by immersion, is not in a form which can be recovered practically. Moreover, all of the foregoing procedures are generally impractical and prohibitively expensive where large surfaces are involved. In addition, extreme safety measures would be required to effectively treat large surfaces by any of the foregoing methods; the measures necessary to protect personnel from stripping chemicals, most of which are exceedingly toxic, essentially prohibit their use for stripping large objects. Another important problem with the foregoing procedures is the difficulty of completely removing the additives from the stripped surface, particularly the waxes used as evaporation retarders in formulations of organic chemical stripping compositions; any residual wax interferes with the adhesion of subsequent coating of the surfaces.

Processes have also been described in U.S. Pat. Nos. 2,689,198 to Judd; 3,794,524 to Nogueira, et al. and 3,832,235 to Cooper, et al. wherein paint is stripped from a relatively small object by contact with the vapors from a boiling solvent composition. In these processes the hot vapors condense to liquids on the painted surface. The resultant hot liquid not only provides a high local concentration of the paint stripping composition, but it also washes off any soluble components of the coating or breakdown products thereof.

Such methods are not applicable for removing protective coatings from extensive surfaces because the cost of heating a sufficient amount of solvent to reflux is prohibitive and moreover, expensive equipment would be needed to carry out such an operation on a large scale. Furthermore, in some constructions, such as large metal tanks and ships, even a moderate temperature differential from one part of the construction to another can be harmful.

It is the current industrial practice to remove paint and other protective coatings from large tanks and other large constructions by the slow, unpleasant and relatively expensive procedure of abrasive blasting. It is important that the ballast tank of a ship, which usually carries ballast water, be rust-proof. To this end, the ballast tank is coated with a layer of paint. If the paint coating blisters or fails in any way, it is necessary to remove the paint from the interior of the ballast tank and repaint, to avoid the possibility of rust and eventual holes. This is especially important for ships which carry liquified natural gas. The ballast tank of a ship may have a capacity as large as one million gallons or more and often has a complex "honeycomb" configuration which makes it difficult and laborious for a blaster to work through. Also, the removal of the large amount of blasting grit needed is costly.

To date, even though abrasive-blasting has severe disadvantages, it is the only procedure in use for removing paint from large surfaces.

SUMMARY OF THE INVENTION

The principal object of the present invention is the provision of a method of stripping a protective coating from a coated object by an economical procedure which avoids the problems associated with known stripping procedures.

Another important object of the present invention is the provision of a method for stripping a protective coating from extensive surfaces by an economical and safe procedure.

A further important object of the present invention is the provision of a method for stripping protective coatings which avoids the use of additives which may interfere with subsequent recoating of the surface.

A further object of the present invention is the provision of a method for stripping protective coatings from extensive surfaces in the interior of a large construction, such as storage tanks, ballast tanks and holds of ships.

Still another object of the present invention is the provision of an economical method for stripping protective coatings from surfaces irrespective of the shape, complexity or inclination thereof.

Other objects of the invention will in part be obvious and will in part appear hereinafter.

With the above and other objects of the invention in view, our invention involves the novel method for stripping a protective coating from a coated surface by contacting the surface with a stripping composition in the gas phase capable of destroying the adhesion between the coating and the surface, substantially in the absence of liquid stripping composition condensate on the surface.

DESCRIPTION OF THE INVENTION

We have discovered that protective coatings may be substantially loosened and in many cases completely stripped from surfaces, solely by the action of the vapors of a stripping composition. By protective coatings is meant any coating based on an organic resin or organic vehicle, such as paint, shellac, varnish, lacquer and the like, which is applied to a surface such as metal or wood for the protection and/or enhancement thereof. The process can also be used to remove coatings not usually called protective, which are included within the meaning of protective coatings in this disclosure. These include residual crude oil, Bunker C fuel oil, and the like which have to be completely removed from the surfaces of holds or tanks when they are to be filled with a different substance which would be contaminated by these residues.

In accordance with our invention, a surface which is to be stripped is contacted with the vapors of a stripping composition until the adhesion between the coating and the surface is destroyed. The gaseous stripping composition is introduced into contact with the coated surface at a concentration, pressure and temperature such that substantially no condensation of the gaseous composition occurs on the coated surface and thus the process takes place substantially in the absence of liquid condensate. Even complex and very large surfaces can be treated readily by the procedure.

Depending on the particular coating, the particular stripping composition, the size of the stripping surface and the equipment used, the time required to destroy the adhesion of the paint ranges from about 1 hour to a few days. Preferably the process is carried out at about ambient temperature. There is no theoretical lower temperature limit for our process. As long as the stripping chemicals have a little vapor pressure, the process works, but the rate slows down at low vapor pressure. The present process is effective at a temperature as low as about 32° F. (0° C.); however, the action of the gaseous stripping composition is faster at higher temperature.

It is a particular advantage of our process that it is unnecessary to heat the gaseous stripping composition to reflux and in most cases it is unnecessary to heat the gaseous stripping composition at all, since most preferably the process is carried out essentially at the temperature of the environment.

When carrying out the process at about ambient temperature, it is preferred that the ambient temperature be at least about 32° F. and even more preferably at about 45° F., otherwise the process may be inconveniently slow for some paint; although even at an ambient temperature below 32° F., the present process may be preferable to other available process such as abrasive blasting.

When the surface which has been thus contacted is freed from the gaseous stripping composition, by air drying or other convenient means, it is found that in many cases, the coating, particularly a paint coating, has either fallen off completely or can be brushed off readily leaving only small specks of paint. In most cases, the surface which has been contacted with the gaseous stripping composition is about 75-95% free of visible coating residue and sometimes no residue is visible. Usually, the surface can be recoated without further treatment. However, even when an objectionable amount of coating remains, the surface can be abrasive-blasted so as to be 100% clean, i.e. a "white metal blast", in a substantially shorter time than that required to obtain a surface which is 100% clean by abrasive-blasting alone. Often, after the surface has been contacted with the gaseous stripping composition in accordance with our invention, sand blasting to achieve a 100% clean surface can be achieved in about 5% to about 20% of the time normally required. In almost all cases, the coated surface which has been vapor treated in accordance with our invention can be abrasive-blasted 100% clean in no more than about 50% of the time normally required.

During the process of our invention, it is believed that the vapor is absorbed into the coating causing the coating to undergo physical changes and to break loose from the substrate. Many epoxy, alkyd, polyurethane and polyester coatings form dry flakes which can be readily and economically disposed of. This is a particularly unexpected further advantage of treatment with a gas phase stripping composition substantially in the absence of liquid condensate in accordance with our invention. When a surface is treated with liquid stripping composition, which occurs when the vapors of a refluxing composition condense to liquids on a cooler painted surface; the liquid stripping composition leaches out components of the coating, making a sticky mess, the cleaning of which is difficult and substantially less economical than the removal of dry flakes.

It has been found that some coatings of chlorinated rubber in particular may be turned into a powder, rather than flakes by a treatment in accordance with the invention; however, the powder is also readily disposed of. In one case, a chlorinated rubber paint was liquified, solely by the vapors of an organic stripping fluid. However, even in such a situation, treatment in accordance with our invention is preferable to abrasive-blasting, which is especially slow with flexible coatings such as rubbers. In the treatment of other chlorinated rubber coatings, it has been found that the coatings are embrittled but are not significantly removed from the surface; however, abrasive-blasting, hydroblasting or brushing removes the treated coating substantially faster after treatment with a gaseous stripping composition in accordance with our invention, than in the absence thereof.

The method of the present invention is particularly advantageous for removing coatings from surfaces within a sealed or sealable container. Moreover, the present method is as effective with regular surfaces as with regular surfaces and the surface may have any inclination; relatively large surfaces, such as the inner surfaces of storage tanks may be treated readily in accordance with the present process.

In another preferred embodiment of our invention, the surface to be treated is substantially sealed from the atmosphere to form a paint stripping zone. A stream of paint stripping composition in the gas phase preferably close to ambient temperature is introduced into the paint stripping zone into contact with the painted surface. In the case of a stripping composition which is liquid at ambient temperature, the gas stream can be generated conveniently by blowing air over the surface of the liquid stripping composition in an evaporator, which is connected to the paint stripping zone by means of chemical resistant conduits. If a stripping compound is used which is normally a gas at ambient temperature, the gas may be introduced directly into the paint stripping zone without use of an air blower. The paint stripping zone is preferably provided with a return conduit to the vacuum side of the air blower, which allows the air and the gaseous stripping composition to be recirculated. As the partial pressure of the gaseous stripping composition increases in the paint stripping zone, air is bled from the stripping zone; normally, the density of the gaseous stripping composition is greater than that of air, so that the air can usually be bled out near the top of the stripping zone. This allows higher concentrations of the gaseous stripping composition to be reached and can be used to prevent an undesirable rise in pressure from occurring.

The evaporators may be heated to replace the heat of vaporization of the liquid stripping composition and to prevent the liquid stripping composition from cooling excessively. But, it is preferable that the gaseous stripping composition be at or near ambient temperature in the conduit and stripping zone.

It is also possible to evaporate the liquid stripping composition inside the paint stripping zone in which case, a special evaporation zone may be eliminated.

Means for circulation of the gaseous stripping composition are desirably included in the paint stripping zone. The efficiency of the present process is increased and the time required to destroy the adhesion of the coating and the surface is decreased when the gaseous stripping composition is thoroughly circulated throughout the stripping zone. For this purpose, efficient gas pumps and/or blowers may be employed.

In the stripping zone the gaseous stripping composition is absorbed into the coating to be stripped, whereby the coating undergoes physical changes and breaks loose from the substrate. The gaseous stripping composition is then pumped from the stripping zone and desorbed from the coating as the partial pressure of the stripping composition drops. The gaseous stripping composition may then be recovered by condensation or vented. The cost of the chemical components of the stripping composition is minute compared to the cost of abrasive-blasting. However, it is not difficult to recover most of the stripping composition used in the present process and recovery avoids air pollution. Air is bled into the paint stripping zone through a vacuum release valve during the removal of the gaseous stripping composition to avoid creating a possibly dangerous vacuum. In most cases and particularly in the case of most epoxy coatings, after the removal of the gaseous stripping composition, the coating is in the form of dry flakes, mainly on the floor of the paint stripping zone; the dry flakes can be quickly and economically removed, for example by a vacuum cleaner.

The gaseous stripping composition may be continuously introduced into the stripping zone and it is also preferable, especially when time is a factor, to continuously remove air from the top of the stripping zone, which may be accomplished through a pressure relief valve set at about 1-2 psi until the air has been substantially removed and the highly concentrated vapors of the more dense stripping compounds are vented. The vented chemical vapors can be condensed for reuse. The gaseous stripping composition may also be continuously withdrawn from the stripping zone, condensed, or retained in the gaseous state and recycled back to the paint stripping zone or where two or more areas are being stripped, the gaseous stripping composition withdrawn from one stripping zone may be circulated to another stripping zone. In large scale operations, blowers are used, in order to distribute the vapors throughout the structure in a reasonable time.

In the event that it is impractical to visually observe the condition of the coating in all parts of a complex construction once it has been sealed, properly located viewports and/or fiber optic devices usually can be conveniently employed to the extent necessary to determine when the process is complete.

No single gaseous compound or mixture thereof has yet been found which is ideally suited to the many types of protective coatings in use today. Normally, a few simple experiments will enable one of ordinary skill in the art to determine an effective compound or mixture. Organic and inorganic compounds known to be useful for stripping paint, shellac, varnish and the like, which have a partial pressure of at least about 5 mm. Hg at ambient temperature can be used in our process. In practice, we prefer to use mixtures containing a relatively high percentage of lower chloroalkanes, particularly chloroalkanes containing 1-3 carbon atoms and 1-3 chlorine atoms. Methylene chloride is an especially useful stripping agent from the point of view of effectiveness, as well as of safety and economy. However, other chloroalkanes, such as 1,2-dichloroalkanes and chloroform are also advantageous. Not only are such chloroalkane mixtures usually more effective and economical, but also fire and explosion hazards may be reduced or eliminated and toxicity greatly reduced. Stripping compositions containing methylene chloride in an amount of about 25 to 100% by volume, more preferably compositions containing methylene chloride as the principal ingredient and even more preferably, particularly for economy and safety, compositions containing about 70, 80 or 85 to 95% of methylene chloride are used.

Compounds which we have found to increase the effectiveness of methylene chloride and other lower chloroalkanes with various coatings include water, lower carboxylic acids, such as formic acid, ammonia, lower-alkylamines, lower alkanols, and lower alkyl ethers, esters, ketones, nitriles, amides, lower alkanes, arenes, such as benzene and lower-alkyl and halogen substituted benzene, and volatile inorganic acids. The term "lower", refers to a compound having one to four carbon atoms. In general, vapor phase compositions, which contain about 70 to 95% of methylene chloride, at least about 1% water and about 4 to 29% by volume of other compounds, such as those just listed are most effective.

For example, gaseous mixtures of methylene chloride and commercial formic acid (85-90% aqueous) in proportions of about 90-97% of methylene chloride to 3-10% of formic acid are very effective for destroying the adhesion of a variety of epoxy coatings to sand blasted steel as well as wood. Several other types of paint, including an alkyd, a polyurethane and a bituminous aluminum paint have been 100% delaminated with a gaseous mixture of methylene chloride/formic acid/water in proportion by volume of about 95% of methylene chloride and about 5% of 85% formic acid. Such a mixture removed a ketimine epoxy coating substantially completely in about 48 hours; on the other hand, a chlorinated rubber coating was converted into a soft powder and a thick coating of glass flake polyester was only partially removed with this mixture of vapors.

It has also been found that lower alkyl amines are powerful activators for methylene chloride in the gas phase; compositions containing about 70 to 90% by volume of methylene chloride and 10 to 30% of 33 to 75% aqueous ethyl amine are particularly useful. A mixture of about 10% by volume of monoethylamine (33% aqueous) and 90% by volume of methylene chloride is more effective than a gaseous mixture containing about 95% of methylene chloride and about 5% of formic acid (85% aqueous) for certain polyurethane, alkyd and epoxy coatings. An epoxy coating which was almost unaffected by the formic acid-methylene chloride mixture has been substantially completely delaminated by means of a gaseous mixture containing about 70% of methylene chloride and 30% of monoethylamine (33% aqueous). Diethylamine has also been found to activate methylene chloride, but generally appears to act more slowly than ethylamine.

Small molecules with dipole moments and acidic or basic character seem to be the most generally useful alone and in combination with methylene chloride for stripping paint. Thus compositions containing about 70 to 95% of methylene chloride, about 1% of water and 4 to 29% of either methyl alcohol or methyl ethyl ketone are also useful.

In some cases, compounds in the gas phase appear to have a synergistic effect with respect to methylene chloride. For example, the gaseous mixture of formic acid and methylene chloride and the gaseous mixture of methylene chloride, diethylamine, methanol and water are surprisingly effective with respect to an arylamine epoxy coating on metal. It is surprising that the latter four-component system has a substantially faster action than that of three-component mixtures wherein either methanol or the amine is omitted. The rate of delamination of an epoxy coating using 85% formic acid vapors was greatly accelerated by the addition of methylene chloride vapors, yet this epoxy was not stripped by methylene chloride vapor alone.

In the event that a gaseous stripping composition is chosen which contains two or more components which do not form a homogeneous solution in the liquid phase, it is preferable to have separate evaporators for each of such compounds.

The particular amount of stripping composition used varies widely, depending upon the nature and thickness of the coating, the ambient temperature and the particular stripping composition selected, as well as the volume of the stripping zone and the area of the coated surface to be treated. Broadly speaking, the ratio of the weight of stripping composition used to that of the coating removed may be from about 0.5:1 to as much as about 4:1. We prefer to use enough stripping composition to ensure that the gaseous stripping composition in the stripping zone is close to saturation with respect to each component of the stripping composition; most preferably the gaseous stripping composition is about 90–99% saturation, so that the coating absorbs the maximum amount of the vapors possible at the prevailing temperature or at the lowest ambient temperature expected during the process. When most of the air is bled off, as in the recycling variation of our process, the atmosphere in the stripping zone is mainly stripping gases. However, the combined partial pressure of the stripping gases is such that substantially no liquid condenses during the treatment.

The method of our invention is particularly advantageous in reducing the cost required to strip unsatisfactory coatings from very large surfaces; the time and material required for the usual procedure of abrasive stripping can be eliminated or substantially reduced.

Provided that the area to be stripped can be substantially sealed from the atmosphere, there is no practical upper limit to the size or complexity of painted structures which can be treated with gaseous stripping compositions in accordance with our invention. The fact that the present procedure neither endangers nor damages the structure by pressure or temperature change is an important advantage of the present process. Moreover, we have observed no corrosion problems whatsoever with respect to metal surfaces using the preferred stripping compositions as disclosed above.

Our method is very economical, since the cost of the chemicals is currently low and moreover, most of the chemicals can be recovered by condensation for reuse. The equipment needed is commercially available at reasonable cost and the manpower requirements are low.

Another important advantage of our paint stripping procedure is that personnel need not be exposed to the chemical stripping agents; the chemicals can be transferred from shipping containers to the stripping system with little or no exposure to the atmosphere.

The method of our invention is especially useful for removing paint from interior surfaces of ballast tanks of ships and large tanks used for storing or processing water, beverages and chemicals. Removal of paint from such large areas with liquid chemicals is clearly impractical; applying a stripping fluid by any of the usual methods is hazardous, time consuming, expensive and may leave undesirable residues.

The following examples further illustrate the present invention, but must not be construed as limiting the invention in any manner whatsoever. In the following examples, as well as in the disclosure as a whole, all proportions of stripping components are by volume unless otherwise indicated; relative proportions of solvents to paint coating are by weight.

EXAMPLE 1

A 16 sq. cm. area of a steel plate which has been abrasive-blasted and spray painted with two coats (12 mils) of an epoxy manufactured by Carboline Co. was grit-blasted to a near white metal condition with a small Speedaire "Sandblasting Gun" (3/16 i.d. nozzle) using "Stanblast" grit (furnace residue) and a pressure of 80 psi. The time required was 85 seconds.

Another portion of the painted surface was placed over a plastic beaker containing methylene chloride (9 ml.) and 90% formic acid (1 ml.); after 14 hrs. exposure to the vapors at 73° F. most of the exposed epoxy coating had delaminated in fragments and fallen into the beaker. The plate was allowed to stand in air (73° F.) for four hours. A 16 sq. cm. area of the treated surface was then grit-blasted to white metal using the aforedescribed equipment and conditions. This took only a fast sweep of not over 5 seconds, only 6% of the time needed for the untreated coating.

EXAMPLE 2

A test panel coated with an arylamine epoxy made by Southern Imperial Coating Corporation required 180 seconds to blast a 16 sq. cm. area to white metal using the same equipment as in Example 1. When exposed to the vapors of 99% methylene chloride - 1% water in a thin layer chromatography (TLC) chamber for 47 hrs. at 73° F. the coating appeared largely separated from the metal. After standing in air 8 hours a 16 sq. cm. area was grit-blasted for 25 seconds; about 90–95% of the surface was free of visible paint residues. Another 25 seconds blasting took it to white metal (no visible paint residue). A 72% reduction in blasting time was realized.

The same plate was next exposed to the vapors of 95% MC - 5% formic acid (88%) in a TLC chamber for several hours at 72° F. and aired for 20 minutes. The blasting time to white metal for 16 sq. cm. was reduced to 7.9 sec., 4% of the time needed for the untreated epoxy. Similar results were obtained when the preliminary treatment with wet methylene chloride vapor was omitted. When a steel panel coated with Bunker C fuel oil was treated similarly the oil ran off the panel completely in 30 minutes.

EXAMPLE 3

A sandblasted steel panel coated with an 8–9 mils of an aryl amine epoxy (Southern Imperial Coating Corporation #1204) was placed in a 148 ml. screw capped jar at 72° F. with 1.32 g. of methylene chloride, 0.03 g. of tap water, and 0.067 g. of 85% formic acid. The panel was supported above the liquids on wire gauze. Within an hour the coating was almost completely delaminated. After 2 days the coating fragments, which had completely fallen off the panel were removed, and dried to constant weight at room temperature. It was found that 2.51 g. of dry paint had been removed by the vapors from 1.44 g. of chemicals.

EXAMPLE 4

A panel coated with a polyurethane paint (Southern Imperial Coating Corp. #4311) was exposed at 72° F. to the vapors of a mixture of methyl ethyl ketone, water, and methylene chloride in the ratio of 5:1:94 by volume was 100% delaminated; the coating fell off in one piece in 2 days.

EXAMPLE 5

A steel panel with a heavy coating of a glass flake polyester (18 mils) was exposed to the vapor mixture of methanol, water, and methylene chloride (5:1:94) for 48 hours at 72° F. Most of the polyester fell of leaving a thin ragged soft coating adhering weakly to the metal. A similar experiment with a 25 mil coating treated with 99% methylene chloride - 1% water gave a similar result except that 7–12 ml. of brittle residual polyester remained. Blasting times were not measured but would obviously be reduced by at least 50%.

EXAMPLE 6

A panel coated on both sides with 6 mils of an alkyd paint on 4 mils of a red primer was put on a wire screen in a desiccator containing 5 ml. of 33% aqueous ethylamine and 45 ml. of methylene chloride for 48 hours. The alkyd coating was about 90% delaminated in 8.5 hrs. and 100% removed in 48 hrs. A faint color due to a little primer left in the anchor pattern was observed.

EXAMPLE 7

A steel panel coated with a 2-coat arylamine epoxy paint (10 mils) was exposed at 63° F. to the vapors from a mixture of 95% methylene chloride and 5% formic acid (90% aqueous) for 16 hours in a covered cylinder. When the panel was lifted out of the cylinder, the coating slipped off leaving only a few fragments of the primer coat on the metal.

EXAMPLE 8

(A) Two steel panels;

(1) coated with an aromatic amine type epoxy (Carboline)
(2) coated with a polyamide type epoxy (Southern Imperial Coating Corp. #1201)

are placed inside a one-gallon receptacle which has been fitted with vapor supply and vapor withdrawal lines (¼ inch i.d.). The receptacle is then substantially sealed from the atmosphere. A small squirrel cage blower (Dayton 4C 047) sealed in a container and connected to the vapor supply and vapor withdrawal lines is used to evaporate a mixture of 93% methylene chloride, 2% water and 5% formic acid (85% aqueous) contained in a round bottom flask and to force the resultant gaseous mixture through the vapor supply line into the one-gallon receptacle, out of the container through the vapor withdrawal pipes and back to the blower, so that the mixture of vapors is continuously recirculated. After six hours of contact with the circulating vapors at 69° F., panel (1) coated with aromatic type epoxy is completely delaminated; however, panel (2) painted with the polyamide type epoxy is not visibly affected by this stripping composition.

(B) A 3×5" steel panel was brush-painted completely with a 4.5 mil coating of Southern Imperial Corp. #1201 polyamide epoxy, the same paint used for panel (2) in part A above. When cured it was found that it took 60 sec. to grit blast a 16 sq. cm. area of the panel to white metal with the blasting equipment described before (80 psi).

The panel was hung in a jar above a mixture of 65% methylene chloride, 25% ethylamine, and 10% water by volume. After 30 hours exposure to the vapors of this mixture, the adhesion of the coating to the metal was almost completely broken and the coating had swollen considerably without tearing much. The panel thus treated appeared to be hanging in a loose plastic bag. When the absorbed vapors were allowed to evaporate, most of the coating shrank back against the panel surface with only a few wrinkles showing; however, very little adhesion was reestablished; one 16 sq. cm. area was blasted to white metal in 12 seconds, another in 5 sec., for an average 86% reduction in blasting time.

Example 8A shows the specificity of stripping compositions and Example 8A and 8B show that a coating which is substantially unaffected by one vapor phase stripping composition is substantially completely delaminated by a different vapor phase composition in accordance with the invention.

EXAMPLE 9

A KTA steel test panel was grit-blasted to white metal and brush-painted with two coats of Cook "Phenicon 980" epoxy to an average of 10 mils dry film thickness. A photo of a KTA test panel is shown in FIG. 7.1–3 of "Steel Structures Painting Manual", J.D. Keene, Ed., published by the Steel Structures Painting Council, 4400 Fifth Ave., Pittsburgh, Pa., Vol. 1, 1966, p. 381 and is incorporated herein by reference. It is a 4 by 6 inch steel plate to which has been roughly welded a piece of ¼ inch steel 4 in. by 1 in. which had been formed into a square-bottomed "U" shape. An area 7 cm. by 7 cm. which included the protuberance and the rough welding areas was very difficult to blast, requiring 6.5 minutes to blast to 98% white metal using the small gun described before at a pressure of 90 psi.

The panel, similarly painted, was exposed to the vapors from a mixture of methylene chloride (90%) and 85% formic acid (10%) for four days at 72° F. and air dried three days. Much of the coating fell off during drying. A small vacuum cleaner (G.E. Model MV-1) pulled off all the remaining shattered coating from the 7 cm. × 7 cm. area of complex structure except for one of the inside corners of the "U". The 7 by 7 cm. area was 100% cleaned to white metal by 8 seconds of blasting at 90 psi. The reduction in blasting time (and grit used) was about 98%.

EXAMPLE 10

A thin layer chromatography chamber containing 200 ml. of a mixture of methylene chloride (90%) and 85% formic acid (10%), with blotting papers to speed up the attainment of equilibrium between the liquid and the vapor phases, was cooled to 0° C. in crushed ice in an insulated box. A sand blasted metal panel, coated 5 mils thick with "Phenicon 980", an epoxy paint obtained from Cook Paint and Varnish Company, was suspended in the vapor space. Within 6 hours, the coating was mainly in the form of large, torn blisters with not more than 20% of the coating still adhering to the metal. After another 16 hours (overnight - longer than was needed), the panel was removed and most of the paint fell off. The rest, except for a few specks, was easily removed by brushing after the absorbed chemicals had evaporated.

In the same equipment at 72° F. (22° C.), a similar panel was 99% delaminated in 3 hours.

EXAMPLE 11

In a small desiccator containing 100 ml. of a mixture of 70% aqueous ethylamine (14%) and methylene chloride (86%), the liquid and vapor phases were separated by a wire screen. Two pine wood panels covered with different protective coatings, which had been applied by dipping, were placed on the screen and allowed to stand for two days at 72° F. (22° C.).

Panel (1) was coated with "Flow-Lac Varnish Stain" (Sherwin-Williams); this coating ran off the wood leaving it with only a faint tan stain.

Panel (2) was covered with brown "Rustoleum" (Rust-oleum Corp.) a linseed-menhaden alkyd resin-based paint which had been baked for 24 hours at 212° F. (100° C.). This coating blistered and ran off the wood, leaving it clean but slightly stained.

In both cases the wood remained smooth and in good condition, without the "raised grain" effect observed when conventional hot caustic soda is used for stripping.

EXAMPLE 12

The process was scaled up over 1600-fold in an experiment conducted on a hydrostatic paint test tank with interior dimensions 6×6×6 ft (volume 1640 gal. or 216 cu. ft.) made by welding six 6×6 steel plates together. It had an exceptionally deep anchor pattern resulting from several abrasive blastings. The interior of the tank was heavily brush-painted at the welds and then spray-painted several months before with "Phenicon 980", an aromatic amine type epoxy coating made by Cook Paint and Varnish Co. The average dry film thickness on the walls was about 9 mils, and the area painted was about 210 sq. ft. (Two 3.4 sq. ft hatches were not painted). Besides the hatches, which were sealed with rubber gaskets and bolts, there were two 2 in. openings one in the ceiling in the front right-hand corner and one in the floor at the rear-right corner. These were used to introduce and remove chemical vapors.

Using ordinary one-inch steel pipe, a few pieces of one-inch chemical-resistant hose for flexibility, and a number of elbows and Ts an exterior paint-stripping apparatus was built as follows:

From the top opening steel Ts led to: (1) a mercury U-tube manometer, (2) a vent to the atmosphere connected to 9 ft. of downward sloping pipe surrounded by a 6 in. metal tube which could be filled with coolant and (3) about 10 ft of pipe leading to the suction side of a positive displacement gas pump. The pump was a General Motors Model 3-53 from a Model 271 diesel engine modified to accept one inch pipe: It was driven by a 5 H. P. electric motor equipped for reversing the direction of shaft rotation and speed control. The pressure side of the pump was connected to two steel vessels A and B in series used for evaporating and later for condensing the chemicals used. The first, made from 8 in. pipe had a useful volume of 5 gal. while the second, made from a 6 in. pipe would hold 2 gal. Each had two one inch pipes leading into the caps and was equipped with a sight glass with neoprene seals. Vessel B was connected to the bottom opening of the test tank. The vessels were sitting in metal baths containing 17 gal. of water and equipped with immersion heaters.

Methylene chloride (4.2 gal, 16 l.) was put into A and 90% formic acid (0.79 gal., 3 l.) into B. The motor was started at about 425 rpm, forcing about 10 cu. ft./min (cfm) of air from the test tank over the surface of the chemicals in A and B then into the bottom of the test tank, carrying the vapors of the chemicals which evaporated into the air stream. The air-gas stream was recirculated through the system until the concentration of gases was high enough to wreck the adhesion of the paint. The water baths were heated to replace the heat of vaporization of the liquids but the temperature of the gas stream entering the tank was close to the ambient temperature (34°-70° F., 1°-21° C.) and no evidence of the presence of any liquid stripping composition condensate was ever observed in the tank during the experiment. Pumping was interrupted once to add more methylene chloride.

The gas pump was run for 8 hours at 10 cfm with the vent open. The condenser attached to the vent turned out to be underdesigned, and much of the vapors escaped with the vented air; the amount of each chemical which stayed in the test tank was not determined until later, when the vapors were withdrawn and analyzed. Inspection of the interior of the tank was done at intervals by removing the cap from a 3 in. opening in the top hatch cover and lowering a light bulb and an adjustable angle mirror with a 2 ft. handle into the tank. At 3 hours the paint was gone from a 3 sq. ft. area above the input opening in the floor and damaged in an irregular pattern elsewhere. At 5 hours delamination was extensive and, from laboratory experience, it seemed probable that enough chemicals were present to complete the stripping. To make certain the pump was run another 3 hours, when the walls were almost completely bare and pieces of paint were falling like snow from the ceiling. The pump was stopped and the tank was loosely closed with valves and cork stoppers. During most of the experiment the open vent kept the pressure in the tank within 1 Torr of atmospheric.

After standing 14 hours a close inspection showed that essentially all the coating had fallen from the ceiling and walls with the exception of some fragments hanging loosely from the metal and some strips in the welds. This appearance was essentially unchanged during recovery experiments (32 hours) and ventilation with fresh air (4 days). When the tank was opened it was found that the loose fragments could be easily removed with a compressed air blast, a soft brush, or a vacuum except for a few sq. in. of paint trapped in pockets along the welds, and tiny fragments trapped in some of the pits of the anchor pattern all over the tank. The concensus of opinion of several experts who examined the tank was that the condition of the surface was much better than a "commercial blast," and for ordinary purposes, could probably be repainted without any abrasive blasting, but that for the most demanding jobs, for which a near white metal blast is required, a fast "sweep" with an abrasive blast was all that would be needed. This was variously estimated to require 5–15% of the time and material needed for untreated paint.

Recovery of the chemicals absorbed in the paint residue and in the vapor space of the tank was accomplished without noticeable loss by cooling Vessels A and B with ice water and reversing the rotation direction of the motor so that gases were sucked out of the bottom opening at 7 cfm and through the cooled vessels. Air entered through the vent and no odor was detected anywhere. In 6 hrs. 4.7 l. was collected acted after which the rate of recovery dropped off rapidly. A total of 6 liters (1.6 gal) was collected in 32 hours. The paint flakes were vacuumed out and found to weigh 12.5 Kg (27.5 lb) of which about 1.0 Kg (2.2 lb) was formic acid. Analysis of the collected liquids showed that during the stripping the tank contained a total of 7.1 Kg (15.7 lb) of methylene chloride, 1.2 Kg (2.6 lb) of formic acid and 0.15 Kg (0.3 lb) of water. Thus a total of 8.4 Kg of chemicals stripped 11.5 Kg of paint and 7.4 Kg of the chemicals was recovered.

What we claim as new and desire to be secured by Letters Patent is:

1. A method for stripping a protective coating from the surface of a coated object, comprising circulating a stream of a stripping composition in a gaseous state at about ambient temperature and pressure into contact with said surface for a time sufficient to destroy the adhesion between said protective coating and said surface and substantially in the absence on said surface of liquid condensate of said stripping composition, said stripping composition normally being a liquid and having a partial pressure of at least about 5 mm. of Hg. at ambient temperature and pressure.

2. A method according to claim 1 in which said stripping composition comprises a lower chloroalkane and the method is carried out without heating said stripping composition to reflux temperature.

3. A method for stripping a protective coating according to claim 1 and the further step comprising:
    sealing said surface from the atmosphere in a stripping zone.

4. A method for stripping a protective coating according to claim 3 and the further steps comprising:
    withdrawing at least a portion of said air in said stripping zone so that the gas phase in said stripping zone is enriched with said stripping fluid and circulating said gaseous state stripping composition within said stripping zone.

5. A method for stripping a protective coating according to claim 4 wherein from a major portion to substantially all of said air is withdrawn from said stripping zone so that the atmosphere in the stripping zone is mainly stripping gas, the pressure of which is such that substantially no liquid condensate forms on the surface being stripped.

6. A method for stripping a protective coating, according to claim 3 and the further steps of:
    passing a stream of air over said paint stripping composition in an evaporation zone to produce a stream of said paint stripping composition in the gaseous phase,
    introducing the thus formed stream of said stripping composition in the gaseous phase into said paint stripping zone and withdrawing at least a portion of the air from said paint stripping zone, whereby the gas phase in said gas stripping zone is enriched with said stripping composition.

7. A method for stripping a protective coating according to claim 6 wherein from a major portion to substantially all of said air is withdrawn from said stripping zone so that the atmosphere in the stripping zone is mainly stripping gas, the pressure of which is such that substantially no liquid condensate forms on the surface being stripped.

8. A method for stripping a protective coating according to claim 6 and the further steps comprising:
    continuously withdrawing said stripping composition in the gaseous state from said stripping zone,
    continuously recycling said stripping composition in the gas phase which has been withdrawn from said stripping zone back to said stripping zone until the adhesion between said protective coating and said surface has been substantially destroyed and then, withdrawing substantially all of said stripping composition in the gaseous state from said stripping zone.

9. A method according to claim 1 in which said stripping composition is comprised of about 25 to 100% by volume of methylene chloride.

10. A method according to claim 1 in which said paint stripping composition consists essentially of a mixture of methylene chloride as the principal ingredient and at least one additional component selected from the group consisting of water, ammonia, lower alkylamine, lower carboxylic acid, lower alkanol, lower alkyl ether, lower alkyl ester, lower alkyl nitrile, lower carboxylic acid amide and lower alkyl amide, lower alkane, lower alkyl ketone and benzene and lower-alkyl and halogen substituted benzene, heteroaromatic compounds containing up to 8 carbon atoms and volatile inorganic acids, wherein said component has a vapor pressure of at least about 5 mm. of Hg at ambient temperature.

11. A method according to claim 10 in which said stripping composition contains by volume about 70 to 95% of methylene chloride and 5 to 30% of said additional component and wherein said additional component includes at least about 1% of water.

12. A method according to claim 10 in which said stripping composition contains by volume about 70 to 90% of methylene chloride and 10 to 30% of 33 to 75% aqueous ethylamine.

13. A method according to claim 10 in which said stripping composition contains by volume about 70 to 95% of methylene chloride about 1% of water and an additional component selected from methyl alcohol and methyl ethyl ketone.

14. In a method of stripping a protective coating from interior coated surfaces of large constructions, including in particular the interiors of storage tanks on land and holds and ballast tanks of ships, the steps comprising:

sealing said interior surface from the atmosphere to form a stripping zone, forming a stream of stripping composition in a gaseous state capable of destroying the adhesion between said coating and said interior surface, said stripping composition normally being liquid and having a partial pressure of at least about 5 mm. of Hg. at ambient temperature and pressure introducing said stripping composition in the gaseous state into said stripping zone into contact with said interior surface at about ambient temperature and pressure, and at the same time, withdrawing at least a portion of said air from said stripping zone so that the gas phase in said stripping zone is enriched with said stripping composition, circulating said stripping composition within said stripping zone and, maintaining said stripping composition in the gaseous state in contact with said coated surface at about ambient temperature and pressure and substantially in the absence of liquid stripping composition condensate on said surface until the adhesion between said protective coating and said surface is substantially destroyed.

15. A method according to claim 14 in which said stream of stripping composition comprises a lower chloroalkane and is formed without heating said stripping composition to reflux temperature and wherein form a major portion to substantially all of said air is withdrawn from said stripping zone so that the atmosphere in the stripping zone is mainly stripping gas, the pressure of which is such that substantially no liquid condensate forms on the surface being stripped.

16. A method according to claim 14 and the further steps of continuously withdrawing a portion of said gaseous state stripping composition from said stripping zone and recirculating said withdrawn gaseous state stripping composition back into said stripping zone.

17. A method according to claim 14 in which said stream of stripping composition in the gaseous state is formed by passing a stream of air over said stripping composition in an evaporation zone and without heating said stripping composition to reflux temperature.

18. A method according to claim 1 in which said stripping composition comprises a chlorinated hydrocarbon.

19. A method according to claim 1 in which said protective coating is paint.

20. A method according to claim 1 in which said protective coating comprises epoxy paint.

21. A method according to claim 1 in which said protective coating is residual crude oil.

22. A method according to claim 1 in which said protective coating is Bunker C fuel oil.

* * * * *